Nov. 17, 1942.   J. H. SMITH   2,302,396
CLEANSING AND COOLING GASES BY LIQUID IN THE MANUFACTURE OF WATER GAS
Filed April 18, 1940

Inventor
Joseph Herbert Smith.
By Dowell & Dowell
Attorneys.

Patented Nov. 17, 1942

2,302,396

UNITED STATES PATENT OFFICE 2,302,396

CLEANSING AND COOLING GASES BY LIQUID IN THE MANUFACTURE OF WATER GAS

Joseph Herbert Smith, Westminster, England, assignor to Humphreys & Glasgow Limited, Westminster, England Application April 18, 1940, Serial No. 330,431
In Great Britain July 31, 1939

5 Claims. (Cl. 48—87)

In the modern manufacture of water gas it is often essential to cleanse the blast products of the particles and dust carried from the generator, in order to avoid nuisance in the neighbourhood due to their discharge into the atmosphere; and the principal object of the present invention is to accomplish this automatically, preferably on or near the ground level, while at the same time subjecting the gases to such cooling—if any—as may be desired in the circumstances.

Where a waste-heat steam generator is used, any further cooling is usually immaterial; but, in the absence of waste-heat steam generators, the temperature of the blast gases and of the particles and dust carried by them is usually so high that ignition occurs on discharge to the atmosphere, producing objectionable noise, flame and general luminosity. The invention described herein may be applied to avoid all such nuisance and danger, as well as the spread of particles and dust in the neighbourhood.

Figure 1:
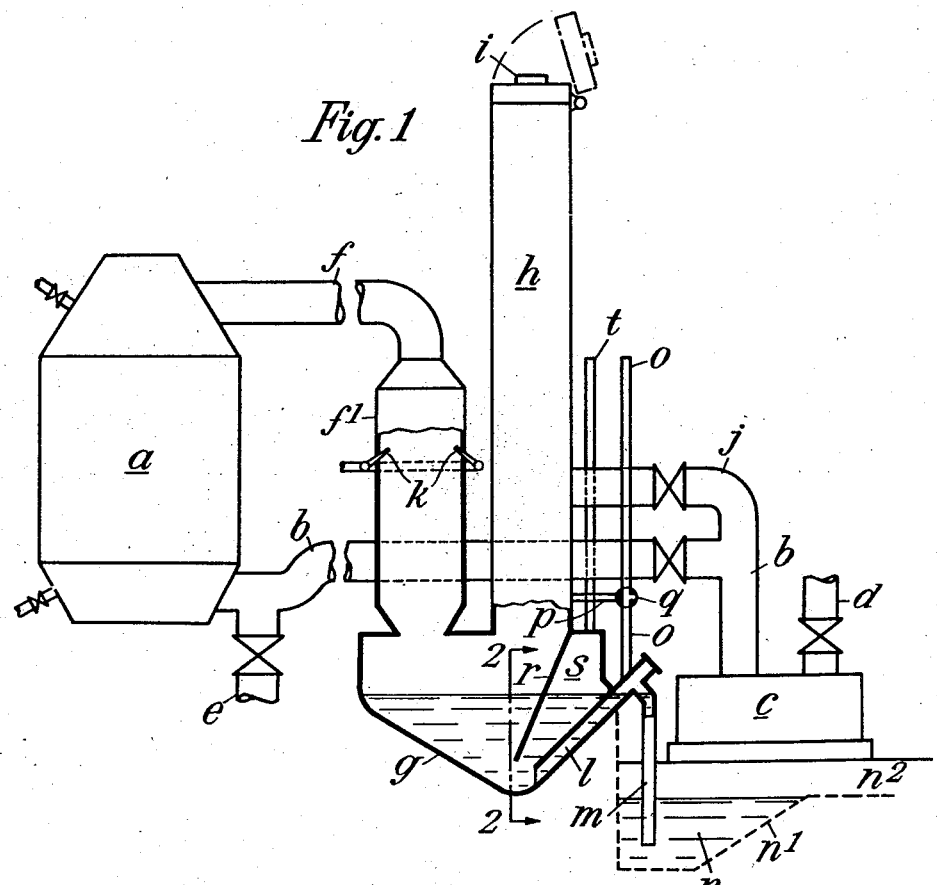
Figure 2:
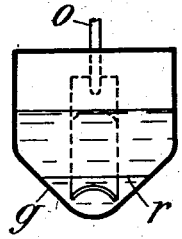

In the accompanying drawing, Fig. 1 shows diagrammatically in side elevation partly in section a water gas plant of simple form embodying the invention and adapted for water gas production by up and down running; Fig. 2 is a section on the line 2—2 Fig. 1.

According to the invention the blast gases—and if desired some or all of the water gas—are passed through a vessel containing and supplied with water in such a manner that the water traps particles and dust which are being carried forward by the gases and water with entrapped particles and dust is periodically expelled from the vessel by an increase of pressure in the vessel. Some of the entrapped particles and dust may be carried away by the natural overflow of any surplus water when the level of water throughout the vessel rises sufficiently; but the vessel is preferably so shaped that most of the particles and dust is localised and accumulated as sediment in the lower portion of the bottom of the vessel, whence it is periodically and automatically washed out of the vessel, through a conduit to which all outflow is or may be restricted, by the swift and scouring expulsion of fluid due to the increase of gaseous pressure above the main body of water caused by the cyclical closing of the stack valve in the ordinary course of gas-making. It is obvious that this rapid displacement of sediment-containing water, which results in the expulsion of the cyclical accumulation of particles and dust, requires a minimum supply of water sufficient in the long run to replace the quantity of water thus expelled; but, if the gases are to be further cooled, as may be required in the absence of a waste heat steam generator, a corresponding additional quantity of cooling water must be supplied; this additional quantity of water may be substantially reduced by its intimate admixture with the gases, preferably before they enter the cleansing and further cooling vessel.

In one arrangement of apparatus according to the invention, an off-take pipe $f$ from the water gas generator $a$ leads downwardly into the top of the cleansing vessel $g$, thus projecting the particles and dust into the water; and another pipe or stack $h$, the lower portion of which serves for the exit of blast gases and, it may be, of water gas, leads upwardly to the stack-valve $i$. The bottom of the vessel $g$ slopes downwardly from ends and sides, thus localizing the accumulation of sediment; and the overflow conduit $l$, being open at its bottom and stretching from near the lowest portion of the vessel $g$ to the liquid overflow level, compels all of the effluent liquid to be discharged from the lower portion of the vessel $g$ into an outside pipe $m$ extending downwardly into a seal pot $n$, the sloping side of which empties into a flume $n^2$ for the ultimate disposal of the sediment; a suitable opening $o$ in the top of the conduit $l$ prevents possibility of syphonic action exaggerating the discharge of water.

To reduce the quantity of water cyclically discharged by gas making pressure and ensure during the blow period sufficient water within the vessel for efficient extraction of particles and dust, there is provided at the top of the conduit $l$ (or outside connection therewith) a pressure controlling device $q$ by means of which the differential in gaseous pressure that produces the cyclical discharge of sediment may be confined to one phase only of the gas making period—that is to say to either the up-run or to the down- or back-run. When the gas making direction in the generator $g$ is reversed, or when some organ of the plant operates it cyclically after the expulsion of the sediment carrying water, the pressure controlling device $q$ closes the top of the conduit $l$ to atmosphere and opens it to the pressure within the vessel $g$, so that the pressures in the top of the conduit $l$ and within the vessel $g$ are the same. This equalizes the water levels within the vessel and conduit respectively, and the sudden pressure thus caused in the outer seal-pipe $m$ flushes sediment from its seal-pot $n$. Thus water supplied to the vessel $g$ until the next predetermined discharging impulse period will be stored therein until it reaches the overflow level established for the efficient extraction of particles and dust from the blast gases.

The automatic pressure controlling device $q$ may comprise pipes leading from the overflow conduit $l$ to atmosphere and to the gas space of the vessel $g$ and as shown includes a three-way cock, or a pair of valves may be used and the device is connected with the reverse-make system of the water-gas generator or provided with other automatic control. The device thus arranged operates so that the top of the conduit $l$ is open to atmosphere during the gas making phase when the difference in pressure between the inside of the vessel $g$ and the top of the overflow conduit $l$ is intended to provide the sediment discharging impulse. The device $q$ closes the top of the conduit $l$ to atmosphere and opens it to the gas space of the vessel $g$ when the vessel $g$ is being charged with water to the desired level, during the blow and while sediment is being forced out of the seal pot $n$. Alternatively, the device may be controlled by an additional point on the usual automatic water gas plant operator so that the pressure differential which causes the sediment-discharging impulse is confined to any desired portion of the gas making period.

In every case, the pressure controlling device $q$ serves also to prevent the possibility of syphonic action interfering with the water levels. Also convenient means may be provided for adjusting the water overflow level.

As means of further reducing, if desired, the quantity of water periodically discharged during the expelling portion of the gas making period, a partition $r$ across the vessel $g$ may be extended from the top downwardly to near the bottom opening of and preferably enclosing, the liquid-discharging conduit $l$. This partition $r$, which is gas-tight at the top and sides and water sealed at the bottom, is placed in such a position as to separate from the main body of the vessel $g$ a section $s$ which is open to atmosphere by pipe $t$ at the top and is sufficient to retain during the gas making period the desired proportion of the water content of the vessel $g$ for return to the general water level when gas making pressure is relieved—thus contributing to the prompt restoration of the normal water level for efficient extraction of particles and dust during the blow, while reducing waste of water through unnecessary overflow under the impulse of gas making pressure.

The invention is applicable both with and without the use of waste-heat steam generators; but, in the absence of such steam production, the temperature of the blast gases should be otherwise reduced, either before entering, within, or on leaving the cleansing and cooling vessel, in order to assure prevention of ignition or luminosity on discharge to atmosphere. This is readily accomplished with economical use of water by spraying the necessary water, preferably upward into the downward current of the blast gases, between the water-gas generator and the cleansing and cooling vessel. This spray may be started and stopped automatically by the opening and closing of the stack-valve or other suitable organ of the plant operating cyclically.

Referring to the drawing, $a$ represents the generator which is provided at the top and bottom with steam inlets and the bottom of which is connected by a water gas off-take pipe $b$ to a washer $c$ having a finished water gas outlet $d$; $e$ is a valved air blast pipe connected with the pipe $b$ near the generator; $f$ is the offtake pipe for blast gases and up-run water gas from the top of the generator. The pipe $f$ is formed with an enlarged downwardly extending portion $f^1$ leading into the top of a water containing vessel $g$ from which another pipe $h$ leads upwardly as a stack to the stack valve $i$ through which the blast gases escape to atmosphere. The pipe $h$ is connected by a valved pipe $j$ to the pipe $b$ beyond its valve so that up-run water gas can be passed through the vessel $g$, the lower part of the pipe $h$, the pipe $j$ and part of the pipe $b$ to the washer $c$ and thence to storage. $k$, $k$, are nozzles through which water is sprayed into the enlarged part $f^1$ of the pipe $f$ to cool the gases entering the vessel $g$ and also to provide a body of water in the vessel $g$ to trap particles and dust contained in the gases and projected into the water.

The generator $a$ contains a deep ignited fuel bed which is alternately blasted with air under pressure to raise its temperature and steamed to produce water gas as well understood. In blasting the fuel bed, the valve in the pipe $e$ and the stack valve $i$ are open and those in the pipes $b$ and $j$ are closed so that the blast gases produced by the upward passage of air through the fuel bed in the generator are driven through the pipe $f$, $f^1$, the upper part of the vessel $g$, the pipe $h$ and stack valve $i$ to atmosphere. When steam is admitted to the bottom of the generator $a$ to effect an up-run, the valves in the pipes $e$ and $b$ and the stack valve $i$ are closed and the valve in the pipe $j$ is open; the water gas produced by the passage of steam upwardly through the fuel bed passes through the pipe $f$, $f^1$, the upper part of the vessel $g$, the lower part of the pipe $h$, the pipe $j$, part of the pipe $b$ and the wash box $c$ and outlet pipe $d$ to storage. During a down-run, steam is shut off from the bottom of the generator $a$ and admitted to the top of the generator, the valve in the pipe $j$ then being closed and that in $b$ open so that the water gas produced by the downward passage of steam through the fuel bed in the generator $a$ passes through the pipe $b$ to the wash box $c$ and thence through the pipe $d$ to storage.

The bottom of the vessel $g$ slopes downwardly from the ends and sides and is provided with an overflow pipe or conduit $l$ extending from near the lowest portion of the vessel to the liquid overflow level where it communicates with an outside pipe $m$ extending downwardly into a water seal pot $n$ having a sloping side $n^1$ leading to a flume or channel $n^2$. Particles and dust trapped in the water in the vessel $g$ deposit as a localized accumulation of sediment in the lower portion of the vessel and, on an increase of pressure arising in the vessel $g$, sediment-laden water will be expelled through the conduit $l$ and pipe $m$ into the seal pot $n$. $o$ is an upwardly extending pipe leading from the top part of the conduit $l$ to atmosphere and having a branch pipe $p$ leading into the lower part of the pipe $h$; at the junction of the branch $p$ with the pipe $o$ is a three way cock $q$ controlling communication between the conduit $l$ and atmosphere and the pipe $h$ respectively. $r$ is a partition extending downwardly from the top of the vessel $g$ to about the open lower end of the conduit $l$ and from side to side of the vessel; the partition $r$ is made gas-tight at the top and sides and its bottom edge is water sealed so that it shuts off from the gas space of the vessel $g$ a section or space $s$ and this space is open to atmosphere through a pipe $t$.

The space $s$ thus serves as a reservoir to retain some of the water displaced from the other side of the partition $r$ during periods of excess pressure there so that this retained water may return thereafter and contribute to prompt restoration of the general water level in the vessel $g$.

During the blasting period of the water gas cycle the stack valve $i$ and blast valve $e$ are open, so that the blast gases, formed while the fuel bed in generator $a$ is being brought to the desired increased temperature, pass off through pipe $f$ and pipe $f^1$, in to which an adjusted amount of water is introduced to suitably cool the gases. The dust and grit are separated from these gases on contact with the water in the vessel $g$ and collect in its lower drawn-in section, and the blast products, cleaned and cooled, pass upwards through the stack valve $i$ and leave the apparatus quietly and without flare or objectionable influence on the neighbourhood.

While blasting and the initial gas making phase of the cycle are proceeding, the position of the regulating device $q$ is such that communication with the atmosphere through the pipe $o$ is closed and communication established between the top of conduit $l$ and the gas space within the vessel $g$ and in both the pressure is the same and, being in excess of atmospheric pressure, depresses the water level in the pipe $m$ and clears pipe $m$ and the outside seal $n$ of collected sediment.

When the position of the regulating device $q$ is altered in changing over to a down (back) run period, there is no communication between the vessel $g$ and the upper end of the overflow conduit $l$ which is then open to the atmosphere, so that the excess of pressure in the vessel $g$ expels sediment carrying water from the vessel through the conduit $l$ and pipe $m$ to the outside seal $n$ and flume. A reversion to up-run steaming restores the position of the pressure regulating device $q$ and equalize the pressures in the upper end of the overflow conduit $l$ and the cleansing vessel $g$ so that the water level in the vessel may rise to the desired level ready for the new blasting period and for the subsequent expulsion of the sediment carrying water.

For the sake of simplicity the illustrated apparatus is so constructed that the blast gases and the up run water gas only pass directly from the top of the generator to the vessel $g$, but it is to be understood that the apparatus may be provided with one or more generative vessels, a waste heat boiler, if required, and, it may be provision for back running as well as or instead of down running and that, by the provision of suitable connections and valves, the back run gas or the down run gas may be passed through the vessel $g$ in addition to or instead of the up-run gas.

What I claim is:

1. Apparatus for the manufacture of water gas embodying a generator, a vessel containing a body of water, an inlet for the blast gases between the generator and the vessel, an outlet pipe from said vessel to atmosphere, a stack valve on said pipe, an overflow conduit extending from the lower portion of the vessel and connected at the overflow level with a water sealed discharge pipe, a communication between the overflow conduit, above the overflow level, and the atmosphere, and means whereby the cyclical closing of the stack valve will cause an increase of pressure above the body of water in the course of gas making and cause cyclical expulsion of sediment containing water through the overflow conduit.

2. In apparatus for the manufacture of water gas according to claim 1 said means comprising a communication between the overflow conduit and the gas space of the water containing vessel; and valve means adapted to open communication between the overflow conduit and the atmosphere during the gas making phase when the difference in pressure between the inside of the vessel and the top of the overflow conduit is intended to provide the sediment discharging impulse and to close said communication to atmosphere and open it to the gas space of the water-containing vessel during another part or phase of the gas making period to cause a pressure increase in the top of the conduit and a rapid displacement of water from the discharge pipe and flushing of sediment from its seal pot.

3. In apparatus for the manufacture of water gas according to claim 1, a partition disposed across the water containing vessel from the top downwardly to about the open lower end of the overflow conduit adapted to form a space which is open to the atmosphere for receiving some of the water displaced from the other side of the partition during the discharge of sediment-carrying water for return thereafter to the general water level.

4. In apparatus for the manufacture of water gas according to claim 1 said means comprising a communication between the overflow conduit and the gas space of the water containing vessel; and valve means adapted to open communication between the overflow conduit and the atmosphere during the gas making phase when the difference in pressure between the inside of the vessel and the top of the overflow conduit is intended to provide the sediment discharge impulse and to close said communication to atmosphere and open it to the gas space of the water-containing vessel during another part or phase of the gas making period to cause a pressure increase in the top of the conduit and a rapid displacement of water from the discharge pipe and flushing of sediment from its seal pot, and a partition disposed across the water containing vessel from the top downwardly to about the open lower end of the overflow conduit adapted to form a space which is open to the atmosphere for receiving some of the water displaced from the other side of the partition during the discharge of sediment-carrying water in return thereafter to the general water level.

5. In apparatus for the manufacture of water gas according to claim 1. said inlet from the generator to the water-containing vessel extending downwardly to the latter; and water spraying nozzles in the said extending portion.

JOSEPH HERBERT SMITH.